July 25, 1961   A. L. M. DINGEE, JR., ET AL   2,993,299
REMOTELY CONTROLLED TRACKLESS VEHICLE
Filed Jan. 23, 1958   2 Sheets-Sheet 1

INVENTORS
ALEXANDER L. M. DINGEE, JR.
THORN W. DICKINSON
BY
KENWAY, JENNEY, WITTER & HILDRETH
ATTORNEYS

INVENTORS
ALEXANDER L. M. DINGEE, JR.
THORN W. DICKINSON
BY

KENWAY, JENNEY, WITTER & HILDRETH

ATTORNEYS

United States Patent Office 2,993,299
Patented July 25, 1961

2,993,299
REMOTELY CONTROLLED TRACKLESS VEHICLE
Alexander L. M. Dingee, Jr., 5 Putnam St., Watertown, Mass., and Thorn W. Dickinson, 175 School St., Bristol, Conn.
Filed Jan. 23, 1958, Ser. No. 710,656
5 Claims. (Cl. 46—244)

The present invention relates generally to apparatus for remote electrical control, and more particularly to apparatus providing electrical power, steering and speed control to a vehicle remotely through a roadbed.

A principal object of the invention is to provide a remotely controlled vehicle adapted for operation upon a roadbed of appreciably greater width than the vehicle, with provision for both steering and speed control thereof.

Another object is to provide remote electrical controls adapted for operation in conjunction with such a vehicle.

Still another object is to provide controls for a vehicle of the above type having positive action and fast response coupled with precision of movement with respect to both speed and steering, through operation of a remote controlling mechanism.

A further object is to provide the above advantages at minimum cost through the use of simple and inexpensive construction.

With the foregoing and other objects in view, the features of the invention include provision of a roadbed having a plurality of mutually insulated lanes, each lane having a wide conducting surface. The vehicle is appreciably narrower than the width of the roadbed and is provided with steering mechanism and a variable speed motor. Both the speed control and the steering control are accomplished through single phase alternating-current devices. The roadbed serves as the transmission circuit and is connected with the vehicle electrically through a pair of contacting elements each in electrical engagement with a separate lane.

Another feature resides in a form of support for the contacting elements of the vehicle, the support providing means for relative movement between the vehicle and the contacting elements thereof. The roadbed is provided with curbs to cooperate with the support to produce relative movement between the vehicle and its contacting elements as the vehicle is caused to approach a curb. By this means the vehicle is physically confined within the limits of the roadbed and additional latitude for steering is provided.

According to another feature, a circuit is provided which makes use of alternating-current and rectifiers to distinguish the steering and speed control signals by polarity discrimination.

Still another feature resides in the compact structural arrangement of the parts within the vehicle, these parts including a drive motor and a steering solenoid operative in opposition to a spring. Also included on the vehicle chassis are a pair of rectifiers to provide polarity discrimination in the circuits of the vehicle.

Other features of the invention reside in certain features of construction, arrangements of the parts and modes of operation that will become clear from the following description of a preferred embodiment thereof, having reference to the drawings, in which—

Figure 1:
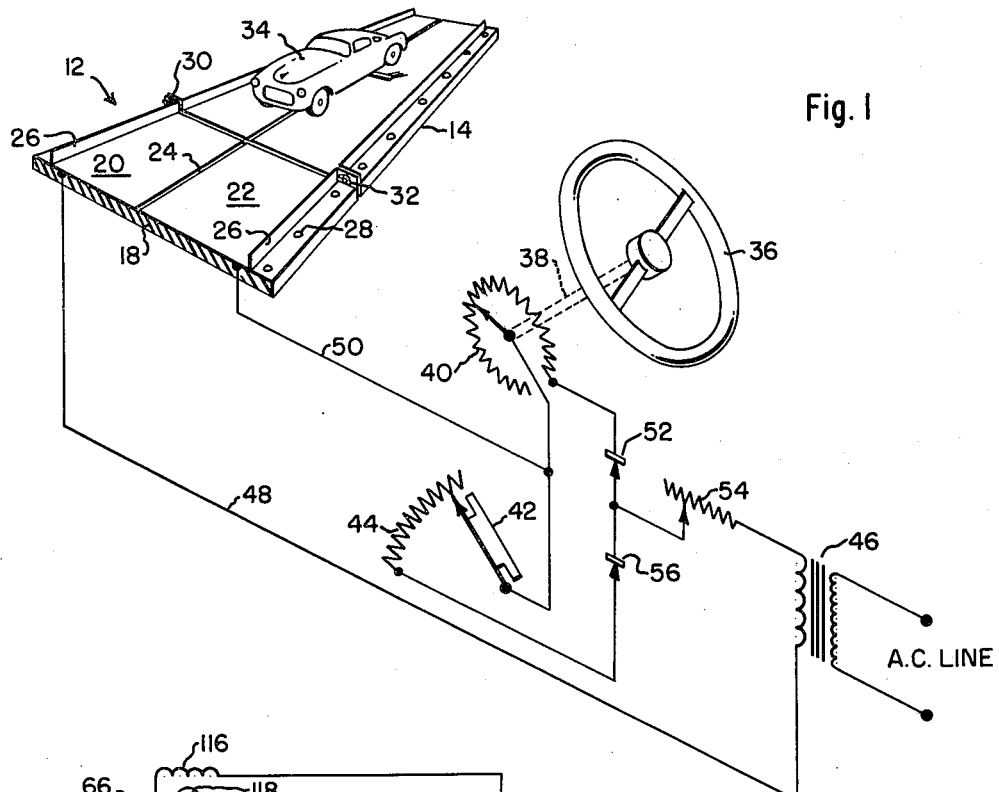
FIG. 1 is a view in perspective illustrating the construction of the roadbed and including a schematic circuit diagram of the remote controlling circuit.
Figure 2:
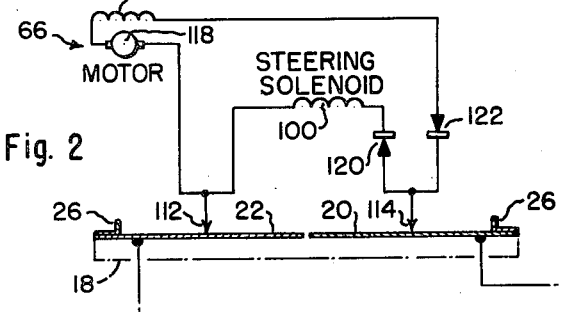
FIG. 2 is a schematic circuit diagram of the receiving circuit in the vehicle shown in cooperative relation to the roadbed.
Figure 3:
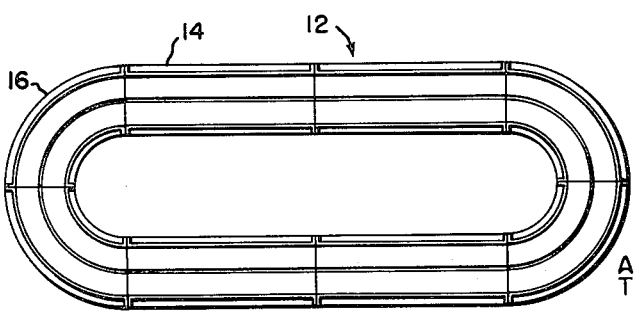
FIG. 3 is a plan view showing a typical fully assembled roadbed.

Referring to FIGS. 1 to 3, there is provided a segmented roadbed designated generally at 12. The roadbed preferably consists of a number of straight sections such as 14 and curved sections such as 16 connected to define a continuous path. It will be apparent that, alternatively, a single unitary roadbed may be provided, but the separate disengageable sections are preferred for convenience in assembly and storage, and flexibility as to the shape of the path. Each section is preferably constructed with a baseboard 18 which may be any suitable insulating material such as wood, tempered fiberboard or plastic. Over this baseboard are secured a pair of conducting, preferably metallic sheets defining adjacent lanes 20 and 22 separated by a narrow margin 24. The lanes 20 and 22 preferably extend substantially to the side margins of the board 18. Metal angle curbs 26 are secured by rivets 28 to the baseboard 18 and in close electrical contact with the lanes 20 and 22. The curbs are provided at each end with tabs 30 for joining the adjacent sections of the roadbed by suitable means such as bolts and wing nuts 32. It will be noted that these tabs and bolts provide means for electrically connecting the lanes of each section to the corresponding lanes of the adjoining section. Thus as illustrated in FIG. 3, each lane is a continuous loop circuit insulated from the other lane; but it will be apparent from the following discussion that each lane may be open-ended if it is desired to provide a physical stop for the vehicle or to allow it to "shoot" beyond the end of the roadbed 12.

The metallic lanes 20 and 22 are preferably firmly bonded to the baseboard 18. The gauge of the metal is a matter of choice, and it is possible to utilize aluminum foil firmly cemented to the baseboard. If desired, the baseboard may be somewhat flexible, in which case it may be desirable to modify the curbs 26 in any suitable manner to increase their longitudinal flexibility correspondingly.

The vehicle is shown at 34. Preferably, it is appreciably narrower than the distance between the curbs 26 in order to provide a substantial latitude for steering. A steering wheel 36 is rotatably supported on a shaft 38 at the remote control position. The shaft 38 is keyed to the rotating brush on a steering rheostat 40. An accelerator pedal is rotatably supported to move the brush of a speed control rheostat 44. Alternating-current power from an external source is connected to the primary winding of a transformer 46. One terminal of the transformer secondary winding is connected by a lead 48 to the lane 20. The lane 22 is connected by a lead 50 to the common brush connections of the rheostats 40 and 44. A fixed terminal of the steering rheostat 40 is connected by a rectifier 52 to the brush of an adjustment rheostat 54. The fixed terminal of the accelerator rheostat 44 is similarly connected by a rectifier 56 to the brush of the rheostat 54.

The contacting elements in the vehicle 34 (described in detail below) engage the lanes 20 and 22 and the circuits of the vehicle are connected therebetween as hereinafter further described. Thus positive current may flow from the secondary of the transformer 46 through the rheostat 54, the rectifier 52, the rheostat 40, the lead 50, the lane 22, and the control circuit of the vehicle 34, returning to the transformer through the lane 20 and the lead 48. Negative current may flow through the rheostat 54, the rectifier 56, the rheostat 44, the lead 50, the lane 22, the vehicle control circuit, the lane 20, and the lead 48. The amplitude of the positive current is controlled by the rheostat 40 in accordance with the position of the steering wheel; while the amplitude of the negative current is controlled by the rheostat 44 in accordance with the position of the accelerator pedal 42.

Figure 4:
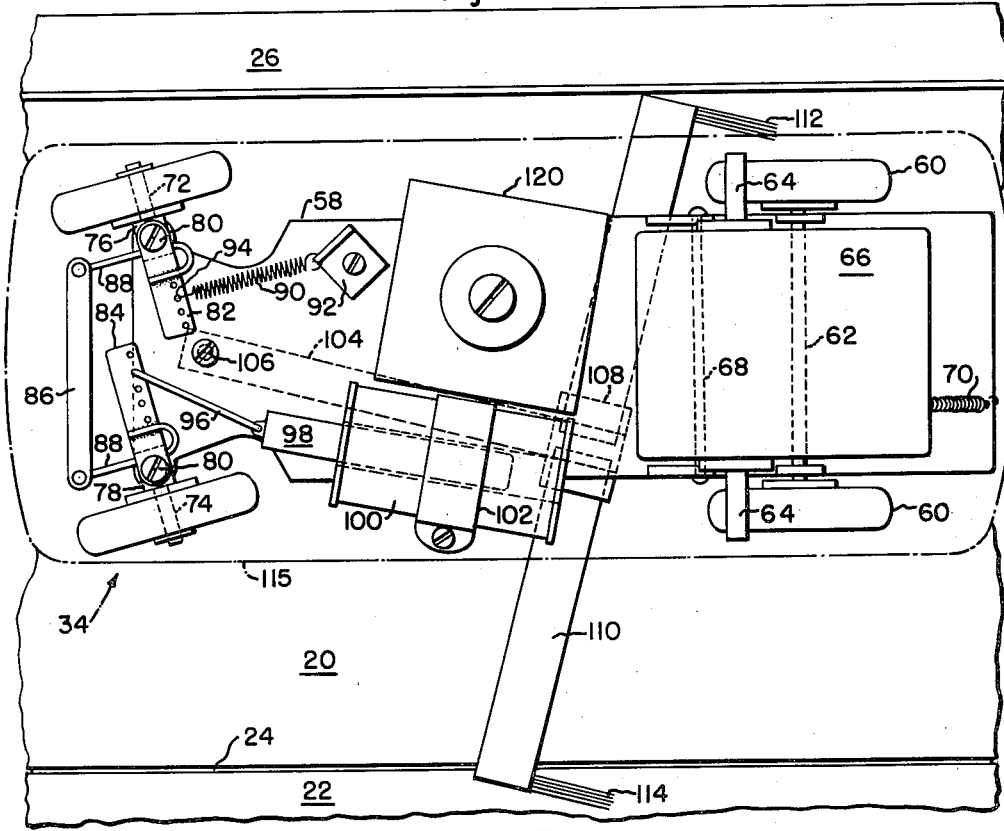
FIG. 4 is a plan view of the vehicle chassis with the assembled steering and speed control parts, the body being represented by phantom lines.
Figure 5:
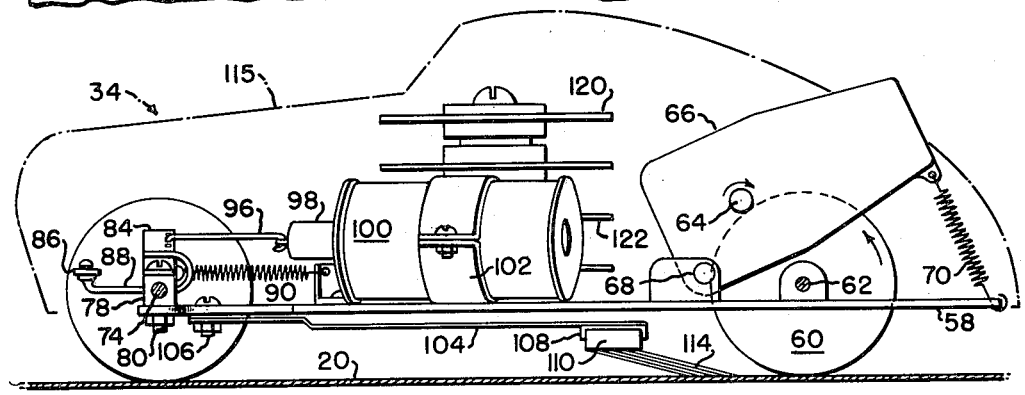
FIG. 5 is a side elevation of the chassis shown in plan in FIG. 4, with the near wheels removed and the steering mechanism set straight ahead.

The construction of the vehicle 34 is illustrated in FIGS. 4 and 5. There is provided a suitable chassis base plate 58. The rear wheels 60 are supported on an axle 62 suspended on the plate 58. These wheels are frictionally driven by a roller 64 which may be a continuation of the armature shaft of a single phase alternating-current motor 66. The housing of the motor is pivotally supported about the axis of a pin 68 secured to the base plate 58, whereby the bearing pressure of the roller 64 upon the wheels 60 is governed by the tension on a spring 70.

The front wheels are mounted on independent shafts 72 and 74 extending from corresponding integral cube-shaped pivot blocks 76 and 78. The blocks are pivotally mounted to the base plate 58 by means of vertical screw studs 80. The blocks 76 and 78 are also rigidly joined with corresponding steering arms 82 and 84. A tie link 86 joins the arms 82 and 84 through stiff springs 88, each secured by welding, brazing or other suitable means to a corresponding arm and pivoted to the link. It will be understood that the link 86 and springs 88 are merely illustrative of suitable means for linking the arms 82 and 84 so as to cause them to turn in unison. Other equivalent means employed in steering mechanisms of this type may also be used.

The steering mechanism is biased to turn in one direction (leftwardly as illustrated) by a tension spring 90, the spring being secured between a bracket 92 screwed to the base plate 58 and a selected hole 94 in the arm 82. The arm 84 is connected by a bail 96 to the core 98 of a steering solenoid 100 secured to the base plate 58 by means of a strap 102. It will be seen that in order to cause the steering mechanism to direct the vehicle straight ahead, it is necessary to apply a sufficient voltage to the solenoid 100 to produce a tension on the bail 96 equal to that which exists in the spring 90 for the desired wheel position.

The contacting elements for the vehicle are supported on a rigid T-shaped support including a stem 104 pivoted by a screw stud 106 in the base plate 58, the support also including a bracket 108. A pair of cross members are secured in the bracket to form a rigid cross arm 110. The arm 110 supports wire brushes 112 and 114 at its ends.

It will be observed that the length of the arm 110 is such that, when the vehicle is near the position illustrated in FIG. 4 with the arm 110 in contact with the curb 26 and the body of the vehicle close to or brushing the curb 26, the brush 114 remains in contact with the lane 22 while the brush 112 is in contact with the lane 20. Thus the vehicle cannot reach a position in which both brushes are simultaneously on the same lane even though each lane is substantially wider than the lateral distance between the wheels as shown in FIG. 4.

It will be appreciated that other methods of support may be provided for the contacting elements 112 and 114. In any case, provision is made whereby when one of the brushes strikes a curb by reason of the vehicle moving closely adjacent thereto, the other brush is restrained to remain on the opposite lane, thus preventing an interruption in the connection between the leads 48 and 50 through the vehicle.

It will be understood that a body 115, illustrated in phantom lines, is secured in any suitable manner to the base plate 58.

The vehicle circuit is illustrated in FIG. 2. This includes the alternating-current motor 66 having a series-connected field winding 116 and an armature 118, the steering solenoid 100 and rectifiers 120 and 122. The brush 114 is connected in common with one terminal of each of the rectifiers. The brush 112 is connected between the steering solenoid and the motor armature. The parallel circuits thus formed are polarity-discriminating, whereby positive current flows through the steering solenoid and negative current flows through the motor 66. As stated above in connection with FIG. 1, the positive current is controlled by the steering rheostat 40, and the negative current by the speed control rheostat 44.

As stated above, in order for the vehicle to steer "straight-ahead," it is necessary to cause a certain current to flow through the steering rheostat 40. The amplitude of this current depends upon the force necessary to overcome the tension in the spring 90 in the desired position. The adjustment rheostat 54 provides means to produce a corresponding zero setting of the steering rheostat 40. Thus the brush of the rheostat 40 may be set at its central position, and the rheostat 54 may then be adjusted until the wheels of the vehicle point straight ahead. This adjustment also affects the operation of the rheostat 44. If it is desired to affect either the steering or the speed control independently, rheostats accordingly may be placed in the corresponding branch circuits.

The apparatus described above is very responsive and precise in its operation. Accordingly, it is useful as an educational device. In addition, its advantages as a toy will be apparent.

While the invention is described with respect to a specific embodiment, it will be appreciated that various changes therein may be made in accordance with the teachings herein and with techniques familiar to those skilled in the art, without departing from the spirit or the scope of the invention.

Having thus described the invention, we claim:

1. A remotely-controlled device having, in combination, a wheeled vehicle provided with a variable speed drive motor, steering mechanism and an electrically-controlled device for operating the steering mechanism, a roadbed having two adjacent, mutually insulated electrically conductive lanes, each lane being substantially wider than the lateral distance between the wheels of the vehicle, a contact support on the vehicle, a pair of contacting elements on the support, said elements each bearing upon a separate lane and being movable over a substantial portion of the width thereof, said elements being spaced apart by a distance greater than the width of a lane, said support being movable in relation to the vehicle to deflect the contacts laterally thereof, a first polarity discriminating circuit connecting said elements through the drive motor, a second polarity dicriminating circuit connecting said elements through said electrically-controlled device, a remote alternating current power source connected between the lanes and adapted to modulate one polarity of current to provide a steering signal and to modulate the other polarity of current to provide a speed control signal, and curbs along the nonadjacent margins of said lanes adapted to constrain and deflect said elements laterally of the vehicle when it is steered toward a curb.

2. A remotely-controlled device having, in combination, a wheeled vehicle provided with a variable speed drive motor, steering mechanism and an electrically-controlled device for operating the steering mechanism, a roadbed having two adjacent, mutually insulated electrically conductive lanes, each lane being substantially wider than the lateral distance between the wheels of the vehicle, a contact support arm pivotally secured to the vehicle, a pair of contacting elements secured to the arm, said elements each bearing upon a separate lane and being movable over a substantial portion of the width thereof, said elements being spaced apart by a distance greater than the width of a lane, said arm being movable in relation to the vehicle to deflect the contacts laterally thereof, a first polarity discriminating circuit connecting said elements through the drive motor, a second polarity discriminating circuit connecting said elements through said electrically-controlled device, a remote alternating current power source connected between the lanes and adapted to modulate one polarity of current to provide a steering signal and to modulate the other polarity of current to provide a speed control signal, and curbs along the nonadjacent margins of said lanes adapted to constrain and deflect said elements laterally of the vehicle when it is steered toward a curb.

3. A remotely-controlled device having, in combination, a wheeled vehicle provided with a drive motor and steering mechanism, a roadbed having two adjacent, mutually insulated electrically conductive lanes, each lane being substantially wider than the lateral distance between the wheels of the vehicle, a contact support on the vehicle, a pair of contacting elements on the support, said elements each bearing upon a separate lane and being movable over a substantial portion of the width thereof, said elements being spaced apart by a distance greater than the width of a lane, said support being movable in relation to the vehicle to deflect the contacts laterally thereof, a circuit connecting said elements through the drive motor, a remote power source connected between the lanes, and curbs along the nonadjacent margins of said lanes adapted to constrain and deflect said elements laterally of the vehicle when it is steered toward a curb.

4. A remotely-controlled device having, in combination, a wheeled vehicle provided with a drive motor and steering mechanism, a roadbed having two adjacent, mutually insulated electrically conductive lanes, each lane being substantially wider than the lateral distance between the wheels of the vehicle, a contact support arm pivotally secured to the vehicle, a pair of contacting elements secured to the arm, said elements each bearing upon a separate lane and being movable over a substantial portion of the width thereof, said elements being spaced apart by a distance greater than the width of a lane, said arm being movable in relation to the vehicle to deflect the contacts laterally thereof, a circuit connecting said elements through the drive motor, a remote power source connected between the lanes, and curbs along the nonadjacent margins of said lanes adapted to constrain and deflect said elements laterally of the vehicle when it is steered toward a curb.

5. A remotely-controlled device having, in combination, a wheeled vehicle provided with a drive motor and steering mechanism, a roadbed having two adjacent, mutually-insulated electrically conductive lanes, each lane being substantially wider than the lateral distance between the wheels of the vehicle, a pair of contacting elements each supported by the vehicle and adapted to be deflected laterally thereof, to bear upon a separate lane and to be movable over a substantial portion of the width thereof, said elements being constrained to remain spaced apart by a distance greater than the width of a lane, a circuit connecting said elements through the motor, a remote power source connected between the lanes, and curbs along the nonadjacent margins of said lanes adapted to constrain and deflect said elements laterally of the vehicle when it is steered toward a curb.

References Cited in the file of this patent

UNITED STATES PATENTS

| | | |
|---|---|---|
| 1,497,382 | Rollason | June 10, 1924 |
| 1,778,465 | Ozanne | Oct. 14, 1930 |
| 1,856,991 | Franklin | May 3, 1932 |
| 2,537,281 | Roshak | Jan. 9, 1951 |
| 2,687,304 | Northrop et al. | Aug. 24, 1954 |
| 2,754,432 | Mostek | July 10, 1956 |
| 2,768,697 | Shotwell | Oct. 30, 1956 |
| 2,812,617 | Longarzo | Nov. 12, 1957 |

FOREIGN PATENTS

| | | |
|---|---|---|
| 456,306 | Italy | Apr. 1, 1950 |
| 81,566 | Netherlands | May 15, 1956 |